310-12 SR

FIP8502 XR 3,924,146

United States Patent [19]

George

[11] 3,924,146

[45] Dec. 2, 1975

[54] MULTIPLE LINEAR MOTOR POSITIONING SYSTEM

[75] Inventor: David J. George, Irvine, Calif.

[73] Assignee: California Computer Products, Inc., Anaheim, Calif.

[22] Filed: Jan. 27, 1975

[21] Appl. No.: 544,300

[52] U.S. Cl. ............ 310/36; 179/115.5 PV; 310/12

[51] Int. Cl.² .......................................... H02K 33/18

[58] Field of Search ................................ 310/12–14, 310/36, 38, 27; 360/78, 106; 179/115.5 PV, 115.5 VC

[56] References Cited

UNITED STATES PATENTS 3,416,535 12/1968 Kalthoff et al. .................. 310/13 X 3,619,673 11/1971 Helms ................................. 310/13

OTHER PUBLICATIONS

IBM Technical Disclosure Bulletin; "High Force Constant Voice Coil Motor for Rapid Seek;" E. P. Rexford; Vol. 12, No. 12, 5/70, p. 2273.

*Primary Examiner*—R. N. Envall, Jr.

[57] ABSTRACT

The specification discloses a simplified linear motor arrangement for a magnetic disk recording unit. Each motor comprises a coil which is attached to a particular recording head to enable each head to be moved and positioned independently of all other heads.

1 Claim, 3 Drawing Figures

MULTIPLE LINEAR MOTOR POSITIONING SYSTEM

BACKGROUND OF THE INVENTION

Conventional prior art magnetic disk memories are structured so that all heads are moved simultaneously by a single positioner. In actuality however, only one of the heads will be used at the completion of the movement. What is actually desired is a simplified linear positioning device which will move one head at a time.

Accordingly, a primary object of the present invention is to provide a low enertia head positioning system for a rotating magnetic memory.

A further object of the present invention is to provide a linear motor arrangement for individually positioning each head.

Other objects and advantages of the present invention will be obvious from the detailed description of a preferred embodiment given herein below.

SUMMARY OF THE INVENTION

The aforementioned objects are realized by the present invention which comprises a positioner having a plurality of spaced permanent magnetic slabs. In one embodiment a linear moving coil is attached to each head arm assembly. In another embodiment, each head arm is pivotally mounted so as to effect a rotational head access upon actuation of a printed circuit motor positioned between the permanent slabs.

Figure 1:
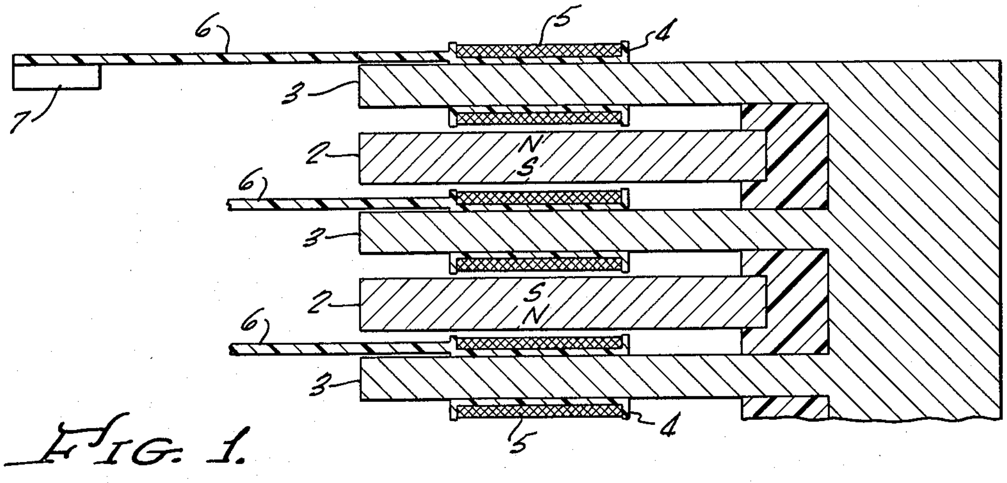
FIG. 1 shows a cross-section of a first preferred embodiment of the invention utilizing linear moving coils to effect head movement.

DESCRIPTION OF A PREFERRED EMBODIMENT:

Adverting to the drawings, and particularly FIG. 1, a first preferred embodiment of the invention comprises a comb 1 of soft magnetic material which functions as a return path for the magnetic flux. A slab 2 of permanent magnetic material is positioned between each tooth 3 of the magnetic comb 1. The slabs 2 are magnetized vertically so as to create a strong magnetic flux in the space between the teeth 3 of the comb and the slabs 2. Each tooth 2 of the comb is adapted to mount a bobbin 4 and its associated coil 5. The teeth 3 thus function as a linear bearing support and guide for the bobbin 4. Attached to each bobbin 4 is a head arm assembly comprised of arm 6 and head 7. When current is passed through one of the coils 5 a magnet force is developed which causes the slideable assembly (bobbin 4, coil 5, arm 6 and head 7) to move in or out along the tooth 3 so as to position a head 6 as desired.

Figure 2:
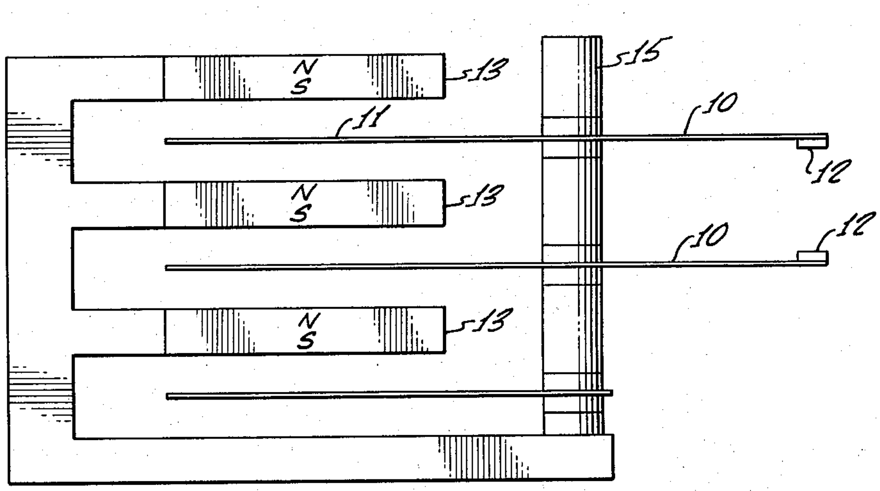
FIG. 2 shows a side elevation of a second preferred embodiment of the invention utilizing a pivoted head arm arrangement.
Figure 3:
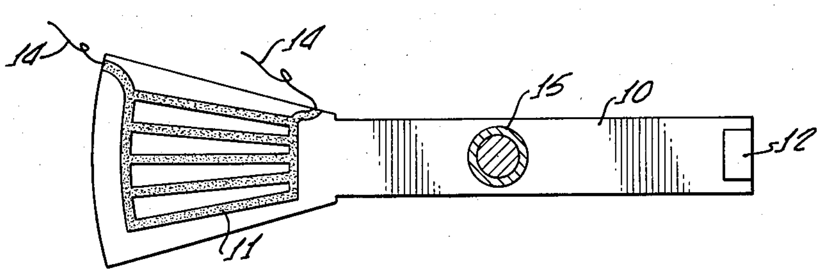
FIG. 3 shows a plan view of the pivotally mounted head arm assembly.

FIG. 2 shows a second embodiment of the invention. In this alternative, the heads 10 are journalled for rotation in about the axis of vertical bearing post 15. Each head arm assembly includes a printed circuit conductor 11 and magnetic head 12. Each of the permanent magnets 13 are magnetized in the same direction (rather than in alternate opposite directions as in the first embodiment). When current is applied to the conductors 11 via the flexible conductors, a magnetic force is exerted on the head arm, causing it to rotate about bearing post 15. The heads 12 are thus individually positioned by the rotating head arm.

Although two preferred embodiments have been shown and described, it will be understood that they are exemplary only, and that numerous changes, modifications and substitutions may be made without departing from the spirit of the invention.

I claim:

1. A magnetic head positioning system comprising:

a column comprised of a plurality of permanent magnetic slabs, each of said slabs to be positioned to have the plane of its surfaces parallel to the plane of the surfaces of each of said other permanent magnetic slabs;

means for separating each of said permanent magnetic slabs from each adjacent slab so as to form a comb;

at least one conductor positioned in the gap between two adjacent slabs of said comb;

a head arm assembly attached to said conductor; and journal means for mounting said head arm assembly to permit a circular motion of said head arm assembly.

* * * * *